(12) United States Patent
Liu

(10) Patent No.: US 6,439,207 B1
(45) Date of Patent: Aug. 27, 2002

(54) GENERATOR OF HIGH OXYGEN MOLECULE

(76) Inventor: Yu-Tsai Liu, 6, Lane Yu Ping, Pei Shih Li, Tsao Tun Town, Nan Tou Hsien (TW)

(*) Notice: Subject to any disclaimer, the term of this patent is extended or adjusted under 35 U.S.C. 154(b) by 0 days.

(21) Appl. No.: 09/994,813

(22) Filed: Nov. 28, 2001

(51) Int. Cl.$^7$ .................................................. B01D 1/30
(52) U.S. Cl. ........................................ 123/536; 210/222
(58) Field of Search ............................... 123/536, 537, 123/538; 210/223, 695

(56) References Cited

U.S. PATENT DOCUMENTS 4,995,425 A * 2/1991 Weisenbarger et al. ..... 210/222
5,055,189 A * 10/1991 Ito ............................... 210/222
6,244,254 B1 * 6/2001 Chen ........................... 123/536

* cited by examiner

*Primary Examiner*—Marguerite McMahon
(74) *Attorney, Agent, or Firm*—Rabin & Berdo, P.C.

(57) ABSTRACT

An oxygen generator is designed to enrich a fuel supply or water supply and is provided in the hollow interior thereof with a positive magnetic body, a negative magnetic body, a number of far infrared granules and pebbles. The granules and the pebbles are caused by a magnetic force to collide with one another, thereby resulting in liberation of the oxygen molecules contained in the granules and the pebbles. The oxygen molecules so released are mixed with the fuel supply or water supply.

1 Claim, 3 Drawing Sheets

GENERATOR OF HIGH OXYGEN MOLECULE

FIELD OF THE INVENTION

The present invention relates generally to a chemical generator, and more particularly to a generator of high oxygen molecule.

BACKGROUND OF THE INVENTION

The are a variety of devices which are designed to improve the fuel combustion system of an automotive engine. None of these conventional devices deals with the improvement of the fuel quality.

SUMMARY OF THE INVENTION

The primary objective of the present invention is to provide a device for generating the high oxygen molecule which is intended to enhance the fuel efficiency of a motor vehicle so as to mitigate the air pollution cause by the motor vehicle. The device of the present invention is of a cylindrical construction and is provided at one end with an inlet and at other end with an outlet. The device is provided in two opposite internal walls of the cylindrical body thereof with a positive magnetic body and a negative magnetic body. The device is further provided in the interior of the cylindrical body thereof with a number of far infrared granules and oxygen-containing pebbles. The device of the present invention is used in conjunction with an automotive combustion system such that the oxygen molecules are released by the granules and the pebbles at such time when the granules and the pebbles are caused by the magnetic force to collide with one another. In light of the efficient fuel combustion of the combustion system, there is less carbon deposit in an engine. The service life span of the engine is thus prolonged.

It is another objective of the present invention to provide a device for generating the high oxygen molecule which is intended to improve the water quality. The device of the present invention is provided in the interior of a cylindrical body thereof with a positive magnetic body, a negative magnetic body, and a number of far infrared granules and oxygen-containing pebbles. The oxygen molecules are released by the granules and the pebbles at such time when the granules and the pebbles are caused by the magnetic force to collide with one another. The water is so improved for use in soaking fruit and vegetable, and for use in brewing tea or coffee.

The features and the advantages of the present invention will be more readily understood upon a thoughtful deliberation of the following detailed description of the present invention with reference to the accompanying drawings.

DETAILED DESCRIPTION OF THE EMBODIMENT

Figure 1:
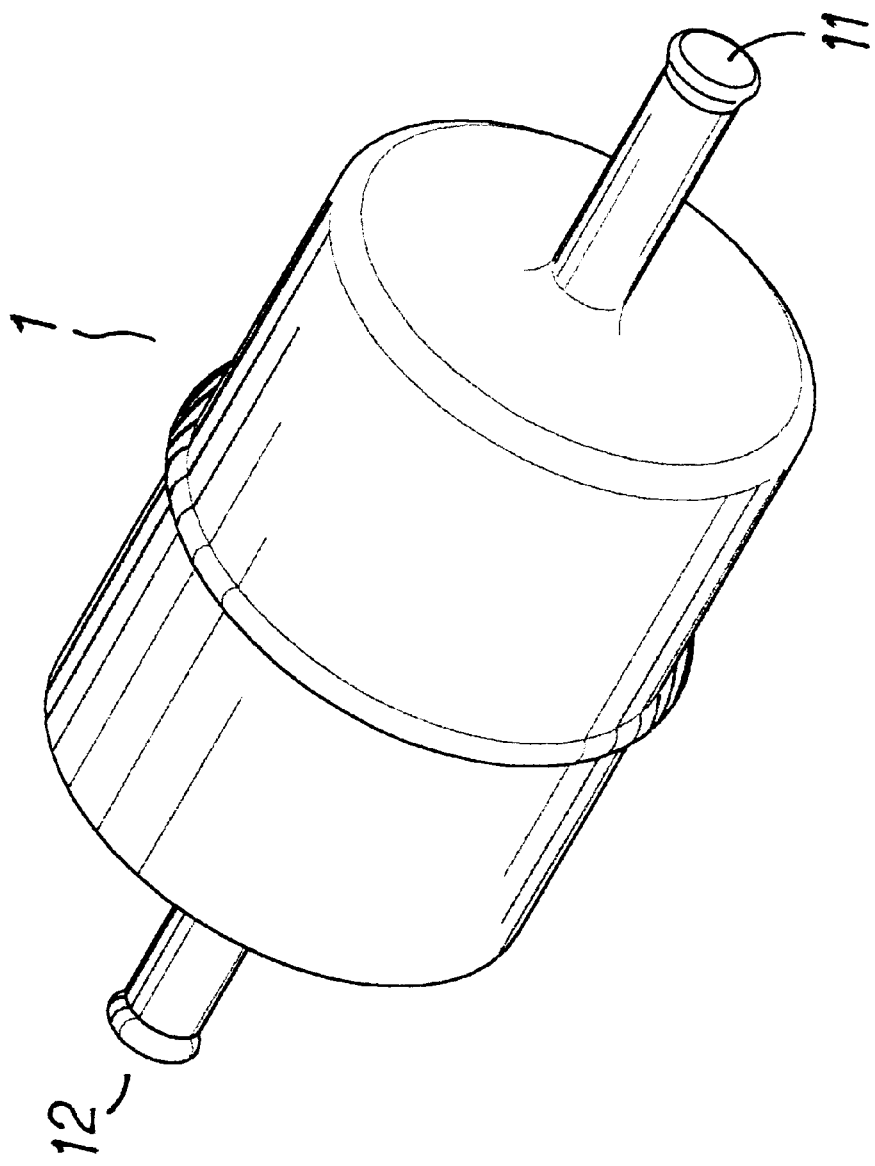
FIG. 1 shows a perspective view of the present invention.

As shown in all drawings provided herewith, a generator of the present invention has a cylindrical body 1 which is provided at one end with an inlet 11 and at other end with an outlet 12. The cylindrical body 1 is provided in two opposite internal walls of an interior thereof with a positive magnetic body 2 and a negative magnetic body 3. The cylindrical body 1 is further provided in the hollow interior thereof with a number of far infrared granules 4 and oxygen-containing pebbles 5.

Figure 2:
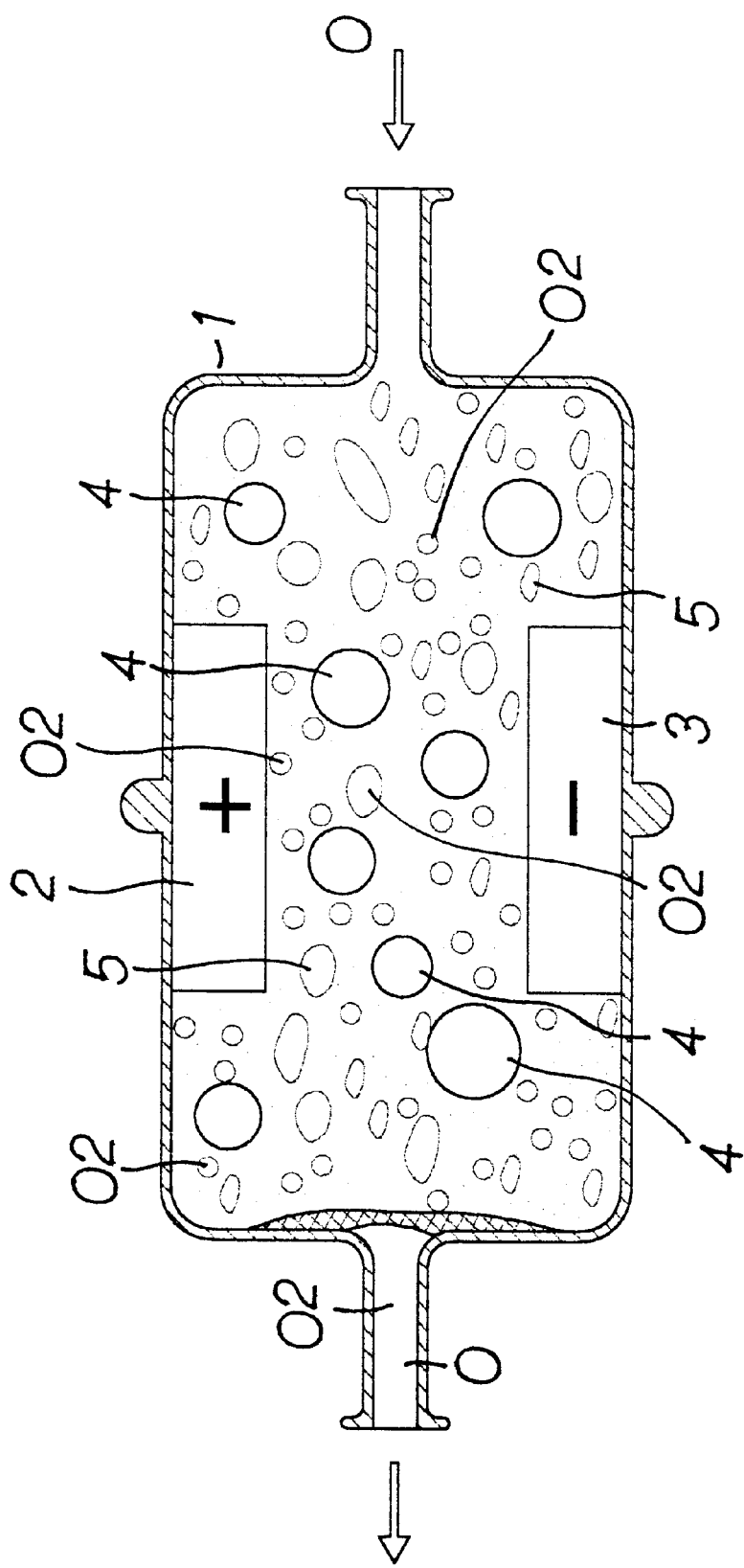
FIG. 2 shows a sectional schematic view of the present invention at work.
Figure 3:
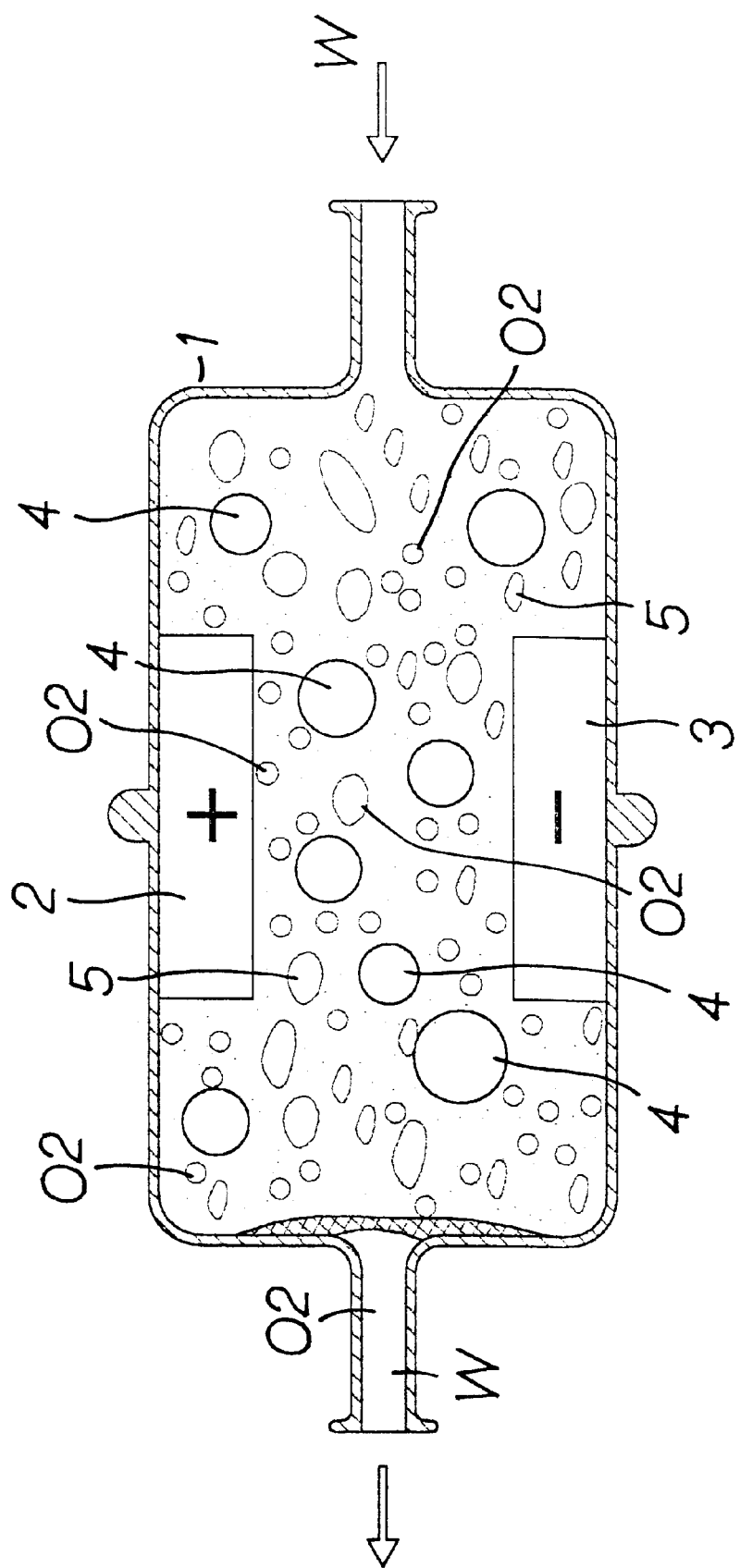
FIG. 3 shows another sectional schematic view of the present invention at work.

As illustrated in FIG. 2, the generator of the present invention is used in conjunction with an automotive combustion system such that the fuel "O" enters the generator via the inlet 11, and that the enriched fuel is guided to the engine combustion chamber via the outlet 12. The process of enriching the fuel takes place in the hollow interior of the cylindrical body 1 of the generator of the present invention such that the far infrared granules 4 and the oxygen-containing pebbles 5 are caused by a magnetic force to collide with one another, thereby resulting in liberation of the oxygen molecules O2 by the granules 4 and the pebbles 5. The oxygen molecules so released are dissolved in the water "W". The enriched water is let out via the outlet 12 and is used to soak fruit or vegetable. The enriched water serves to prolong the freshness of fruit or vegetable. In addition, the enriched water is ideal for brewing tea or coffee. Moreover, the generator of the present invention may be used in conjunction with an aquarium.

The present invention described above is to be regarded in all respects as being illustrative and nonrestrictive. Accordingly, the present invention may be embodied in other specific forms without deviating from the spirit thereof. The present invention is therefore to be limited only by the scope of the following claim.

What is claimed is:

1. An oxygen generator comprising:
    a cylindrical body having a hollow interior, said cylindrical body being provided at one end with an inlet which is in communication with said hollow interior and is connected with a fuel supply or water supply said cylindrical body being provided at other end with an outlet which is in communication with said hollow interior and is connected to an automotive combustion system or water reservoir;
    a positive magnetic body attached to one internal wall of said hollow interior of said cylindrical body;
    a negative magnetic body attached to other internal wall of said hollow interior of said cylindrical body such that said negative magnetic body is opposite in location to said positive magnetic body, and that said negative magnetic body and said positive magnetic body effect a magnetic force;
    a number of far infrared granules whereby said granules are randomly deposited in said hollow interior of said cylindrical body and contain oxygen; and
    a number of oxygen-containing pebbles, said pebbles being randomly deposited in said hollow interior of said cylindrical body;
    said granules and said pebbles being caused by the magnetic force to collide with one another, thereby resulting in liberation of the oxygen contained in said granules and said pebbles such that the oxygen so released is mixed with the fuel supply or water supply before the fuel supply or water supply is let out via said outlet of said cylindrical body.

* * * * *